（12）United States Patent
Ogo et al.

(10) Patent No.: US 7,476,170 B2
(45) Date of Patent: Jan. 13, 2009

(54) DOUBLE-SIDED SILENT CHAIN

(75) Inventors: Toshitaka Ogo, Osaka (JP); Toshifumi Sato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 612 days.

(21) Appl. No.: 11/151,502

(22) Filed: Jun. 13, 2005

(65) Prior Publication Data

US 2005/0277507 A1 Dec. 15, 2005

(30) Foreign Application Priority Data

Jun. 15, 2004 (JP) .............................. 2004-177491

(51) Int. Cl.
*F16G 13/02* (2006.01)
(52) U.S. Cl. .................. 474/212; 474/206; 474/213
(58) Field of Classification Search ................. 474/206, 474/212, 213–215
See application file for complete search history.

(56) References Cited

U.S. PATENT DOCUMENTS

| | | | | |
|---|---|---|---|---|
| 5,445,570 A | * | 8/1995 | White | 474/213 |
| 5,967,926 A | * | 10/1999 | Kozakura et al. | 474/213 |
| 5,989,140 A | * | 11/1999 | Ichikawa et al. | 474/148 |
| 6,142,902 A |   | 11/2000 | Ichikawa et al. | |
| 6,406,394 B1 | * | 6/2002 | Bubel et al. | 474/212 |
| 6,419,604 B2 | * | 7/2002 | Saito et al. | 474/213 |
| 6,440,022 B1 | * | 8/2002 | Ichikawa et al. | 474/213 |
| 6,805,646 B2 | * | 10/2004 | Kozakura et al. | 474/213 |
| 7,229,375 B2 | * | 6/2007 | Hummel et al. | 474/213 |
| 2002/0013191 A1 | * | 1/2002 | Saito et al. | 474/213 |
| 2002/0025870 A1 | * | 2/2002 | Kozakura et al. | 474/214 |
| 2002/0155911 A1 | * | 10/2002 | Hummel et al. | 474/212 |
| 2004/0166978 A1 |   | 8/2004 | Matsuda et al. | |
| 2005/0130779 A1 | * | 6/2005 | Sudo et al. | 474/213 |

FOREIGN PATENT DOCUMENTS

| | | |
|---|---|---|
| JP | 2553206 | 7/1997 |
| JP | 11-166600 | 6/1999 |
| JP | 11-257439 | 9/1999 |

* cited by examiner

*Primary Examiner*—Robert A Siconolfi
*Assistant Examiner*—Thomas W Irvin
(74) *Attorney, Agent, or Firm*—Howson & Howson LLP

(57) ABSTRACT

In a double-sided silent chain, the backs of the outermost link plates, which have their teeth protruding in one direction, are higher than the backs of the inner link plates, which have their teeth protruding in the opposite direction. The backs of the outer link plates adjacent the outermost link plates may also be higher than the backs of the inner link plates, and are preferably equal to the heights of the backs of the outermost link plates. The outermost link plates and their adjacent outer link plates are preferably of the outer tooth contact/outer tooth seating type.

2 Claims, 7 Drawing Sheets

Comparison of rotational fatigue strengths between Examples of the present invention and conventional example

DOUBLE-SIDED SILENT CHAIN

FIELD OF THE INVENTION

This invention relates to improvements in a double-sided silent chain, that is, a silent chain formed into an endless loop and adapted for driving engagement with two or more sprockets inside the loop and one or more sprockets outside the loop. Such a chain is composed of a plurality of link plates, each having a pair of pin holes, a pair of link teeth projecting in a first direction, and a flat back surface facing in the opposite direction. The link plates are interleaved, alternately displaced longitudinally, and connected to one another by connecting pins as in the case of a conventional silent chain. In a double-sided chain, however, the link plates are arranged so that the teeth of one set of link plates protrude toward the inside of the loop, and the teeth of another set of link plates protrude toward the outside of the loop.

BACKGROUND OF THE INVENTION

Japanese Laid-open Patent Publication No. Hei. 11-166600, U.S. Pat. No. 6,142,902, and Japanese Utility Model Publication No. 2553206, describe double-sided silent chains having teeth protruding both toward the inside and toward the outside of a loop. Sprockets engaged with the outwardly protruding teeth and sprockets engaged with the inwardly protruding teeth rotate in opposite directions.

Double-sided silent chains have been used as timing chains in automobile engines. In the case of a timing chain, the inwardly protruding teeth are engaged with a crankshaft sprocket, and one or more camshaft sprockets, for example, sprockets on an intake valve cam and an exhaust valve cam respectively, so that the crankshaft and camshaft sprockets rotate in the same direction. The outwardly protruding teeth may be engaged with sprockets for driving auxiliary equipment such as an oil pump and the like. The sprockets driving the auxiliary equipment rotate in a direction opposite to the direction of rotation of the crankshaft and camshaft sprockets.

FIGS. 7 and 8 show an example of a conventional double-sided silent chain 51, composed of link plates 55 and 56, each having a pair of teeth 52 and a pair of pin holes 53. The plates are interleaved, alternately displaced longitudinally, and connected in an endless loop by connecting pins 57. Link plates 56 extend in two side-by-side, lengthwise columns one being on the left side of the chain and the other being on the right side of the chain. The teeth 52 of links 56, protrude upward in FIG. 8. The teeth 52 of the intermediate links 55 protrude downward. FIGS. 7 and 8 show an upper run of the chain. The upwardly protruding teeth protrude toward the outside of the loop, and are adapted to drive sprockets on auxiliary equipment, and the downwardly protruding teeth protrude toward the inside of the loop and are adapted to be engaged with a crankshaft sprocket and one or more camshaft sprockets. The link plates 55 are arranged so that their back surfaces 54 are disposed in a common plane when the chain is straight. Likewise, link plates 56 are arranged so that their back surfaces 54 are disposed in a common plane when the chain is straight. The connecting pins 57 are fitted to the pin holes 53 of the outermost link plates 56, and fixed only to the outermost link plates, thereby allowing articulation of the widthwise rows of link plates.

FIGS. 9 and 10 each show a lower run of the same chain in meshing engagement with an external sprocket 58, i.e., a sprocket outside the loop of the chain, on a shaft 60. The sprocket, the structure of which can be understood more clearly from FIG. 12, has two, axially spaced, sets of teeth 59. In FIG. 9, the section plane intersects the middles of two of the outermost link plates 56, whereas in FIG. 10, the section plane intersects the middles of two link plates 56 adjacent the outermost link plates. FIG. 9 shows a location at which sprocket teeth 59 are in engagement with outer tooth surfaces of the link plates 56 located adjacent the outermost link plates. FIG. 10 shows a location at which the sprocket teeth 59 are in engagement with the outer tooth surfaces of the outermost link plates. As shown in FIG. 9, the outermost plates of the set of inner link plates 55 come into sliding contact with the inner side walls of the sprocket teeth 59, to prevent lateral vibration of the chain.

FIG. 11 shows the engagement of link teeth 52 of inner link plates 55, which protrude toward the inside of the chain loop, with teeth 62 of a conventional sprocket 61 on a shaft 63

In the conventional double-sided silent chain 51, as described above, tension is generated in the inner circumferential portions of the pin holes 53 of the outermost link plates when the connecting pins 57 are fitted into the pin holes 53. Collision of the teeth of the outer link plate with the teeth of a driven sprocket external to the chain loop also applies a stress to the inner circumferential portion of the pin holes. The tension and stress produce a synergistic effect, lowering the strength of the outermost link plates.

The inner link plates 55 and the outer link plates 56 of a conventional double-sided silent chain typically have the same shape. Since the minimum distance between the back of a link plate and its tooth gap bottom (distance H in FIG. 5) is comparatively low, the middle portions of the link plates 55 and 56 are relatively weak. This weakness, in the outermost link plates, manifests itself in the formation of cracks near the tooth gap bottom, a progressive decrease in the strength of the outermost link plates, and a reduction in rotational fatigue strength of the chain.

The problems caused by weakness in the outermost link plates of a double-sided silent chain can be addressed by substitution of guide plates having no teeth for the outermost, toothed, link plates. However, with this approach, the teeth of the link plates adjacent the guide plates are easily worn. To suppress wear of the teeth of these link plates, their thickness can be increased, or additional link plates can be provided. However increasing the width of a link plate, or adding link plates, results in a disadvantageous increase in the width of the chain.

The principal objects of this invention are to solve the above-mentioned problems, and to provide a double-sided silent chain in which the decrease in strength at the central portions of the outermost link plates is prevented, and rotational fatigue strength of the chain is improved.

SUMMARY OF THE INVENTION

The double-sided silent chain according to the invention comprises a plurality of link plates, each having a pair of pin holes, a pair of link teeth projecting in a first direction, and a flat back surface facing in the opposite direction. The link plates include outermost link plates in the widthwise direction of the chain, and the link plates are interleaved, connected together in an endless loop by connecting pins extending through their pin holes, and fixed to the outermost link plates. The link plates include a first set of link plates, including the outermost link plates and adjacent outer link plates, and a second set of link plates disposed between the outer link plates. The teeth of one of the sets project toward the inside of the loop, and the teeth of the other set project toward the outside of the loop. The heights of the backs of the outermost link plates are greater than the heights of the backs of the inner link plates.

In one embodiment, the heights of the backs of the outermost link plates are also greater than the heights of the adjacent outer link plates.

In another embodiment, the heights of the backs of the outermost link plates and the heights of the backs of the adjacent outer link plates are both greater than the heights of the backs of the inner link plates, and preferably equal. Preferably, the backs of the outermost link plates and the backs of the adjacent outer link plates include flat portions which, when in a straight portion of the chain, are coplanar.

The outermost link plates and the adjacent outer link plates are desirably of the outer tooth seating type, the teeth of the link plates being configured so that, when the link plate is seated on a sprocket so that there is no relative movement between the link plate and the sprocket, the sprocket teeth are engaged with outer tooth surfaces of the link teeth.

The invention solves the problems encountered in conventional double-sided silent chains by improving the strength of the central portions of the outermost link plates. The improvement in strength of the central portions of the outermost link plates prevents deformation of the link plates as a result of collision of their teeth with sprocket teeth at the start of engagement with a sprocket, prevents cracks from occurring at the tooth gap bottoms, and improves the rotational fatigue strength of the chain. Further improvements can be realized when the heights of the backs of the outermost link plates and the heights of the backs of the adjacent outer link plates are both greater than the heights of the backs of the inner link plates.

Preferably, the outermost link plates and the adjacent outer link plates are both of the outer tooth contact and outer tooth seating type. In this case, at the start of engagement between the chain and the sprocket, the outer tooth surfaces come into contact with tooth surfaces of sprocket teeth, and the outer tooth surfaces of the link teeth also contact the sprocket teeth when the chain is seated on the sprocket. Consequently, the inner tooth surfaces do not come into contact with the sprocket teeth, and as a result, the load applied to the central portion of the link plates is decreased, the fatigue strengths of these link plates can be further improved, and the rotational fatigue strength of the chain is also further improved.

DETAILED DESCRIPTION OF THE PREFERRED EMBODIMENTS

Figure 1:
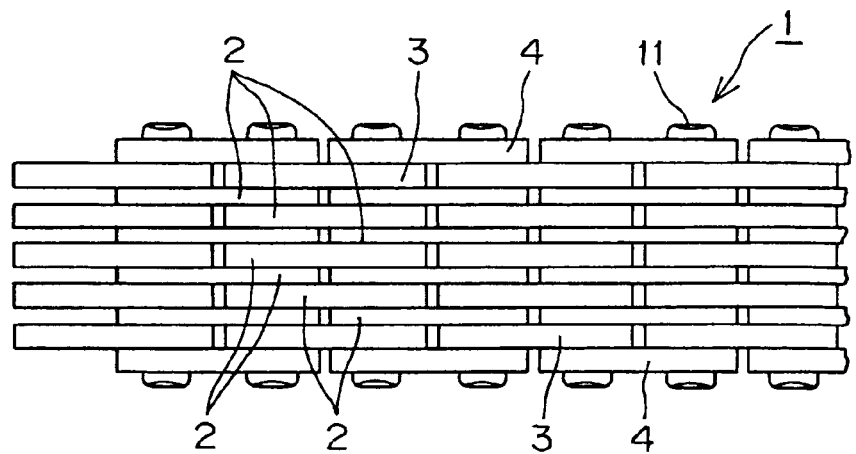
FIG. 1 is a plan view showing a part of a double-sided silent chain according to a first embodiment of the invention.

A first embodiment of the invention will be described with reference to FIGS. 1, 2, 5 and 6. The link plates of the chain are interleaved, alternately displaced longitudinally, and connected in an endless loop by connecting pins. The link plates are also disposed so that teeth protrude toward both the front and back sides of the chain.

In the first embodiment, the inner link plates 2, and the outer link plates 3, which are adjacent, but inward with respect to the outermost link plates 4, are of the same size and shape. Each of these link plates has a pair of pin holes 7, a pair of protruding teeth 5, and a flat back surface 8 facing in the direction opposite to the direction in which the teeth 5 protrude.

Figure 2:
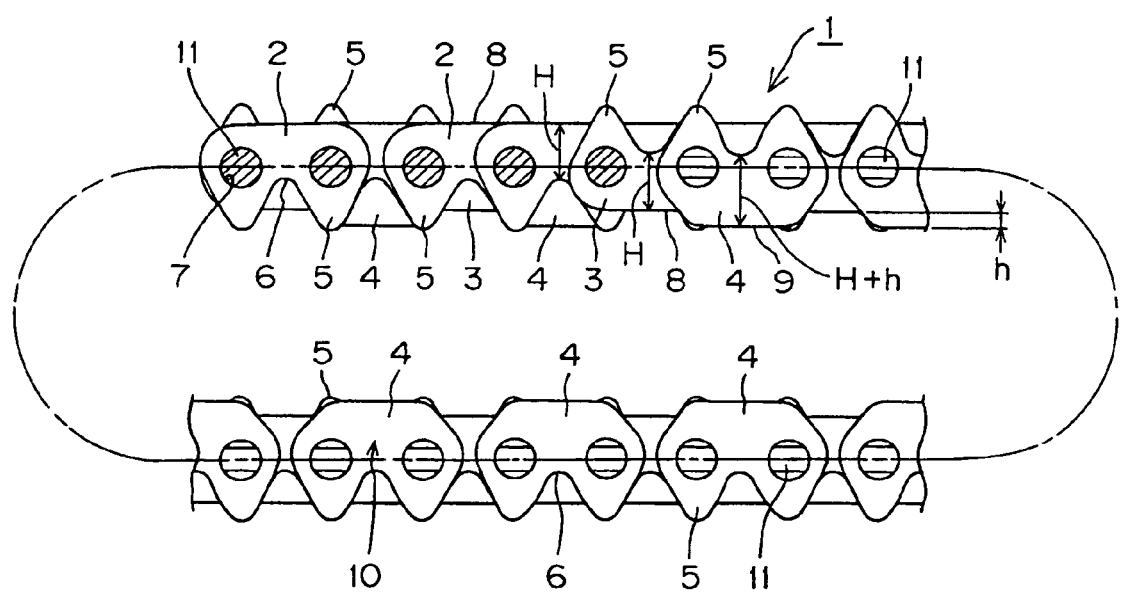
FIG. 2 is a partially broken-away side view showing portions of the double-sided silent chain of FIG. 1.

Each of the outermost link plates 4, which are disposed along both sides of the chain, has a pair of teeth 5, a pair of pin holes 7, and a flat back surface 9. However, the back surfaces 9 of these outermost link plates are higher than the back surfaces 8 of link plates 2 and 3. That is, the minimum or shortest distance from the back surface to the deepest part of the gap between the teeth, is greater for the outermost link plates than for the inner link plates and the adjacent outer link plates. Thus, as seen in FIG. 2, while the heights of the backs of the inner link plates 2 and the outer link plates 3 is H, the height of the backs of link plates 4, is H+h. The greater height of the backs of link plates 4 results in improved strength of the central portion 10 of the link plate.

The number of inner link plates 2 across the width of the chain is preferably an odd number, e.g. seven in the embodiment shown in FIG. 1, alternate rows having four and three inner link plates, respectively. The number of outer link plates across the thickness of the chain is preferably an even number, in this case, four, including the outermost link plates 4 and the adjacent outer link plates 3. As shown in FIG. 2, the teeth 5 of the inner link plates 2 protrude toward the inside of the chain loop, while the teeth 5 of the outer link plates 3 and 4 protrude toward the outside of the loop.

The connecting pins 11 are secured to the pin holes in the outermost link plates 4 by press-fitting, caulking, or other suitable means, but extend through the pin holes in the other plates with a loose fit to permit articulation of the chain.

The link plates used in the silent chain of the invention may be outer tooth seating type link plate or inner tooth seating type link plate. When a silent chain begins to engage a sprocket, typically an inner tooth surface, that is the inner flank extending from a tooth gap bottom to a tooth head, first engages a sprocket tooth. Thereafter, as the chain proceeds to wrap around the sprocket, the chain teeth and the sprocket teeth make sliding contact with each other until the chain becomes fully seated on the sprocket. Afterwards, with further rotation of the sprocket, the engagement of the chain with the sprocket is gradually released. The chain may be seated either with the outer tooth surfaces of its links in engagement with the sprocket teeth, or with the inner tooth surfaces of its links in engagement with the sprocket teeth. The seated condition depends on the profiles of the tooth surfaces of the sprocket teeth and on the profiles of the tooth surfaces of the link teeth.

Figure 5:
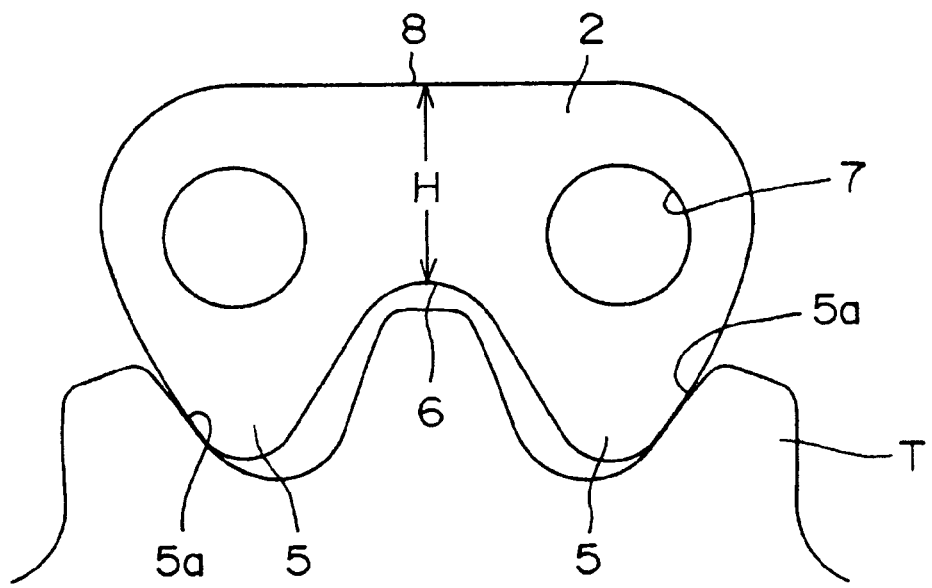
FIG. 5 is a schematic view showing the engagement of an outer tooth seating type link plate with a sprocket.
Figure 6:
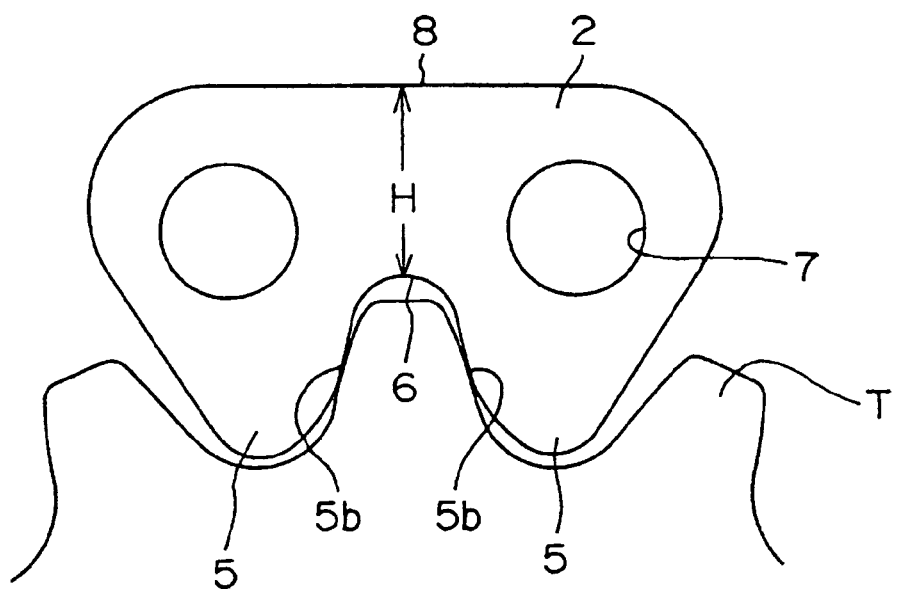
FIG. 6 is a schematic view showing the engagement of an inner tooth seating type link plate with a sprocket.
Figure 7:
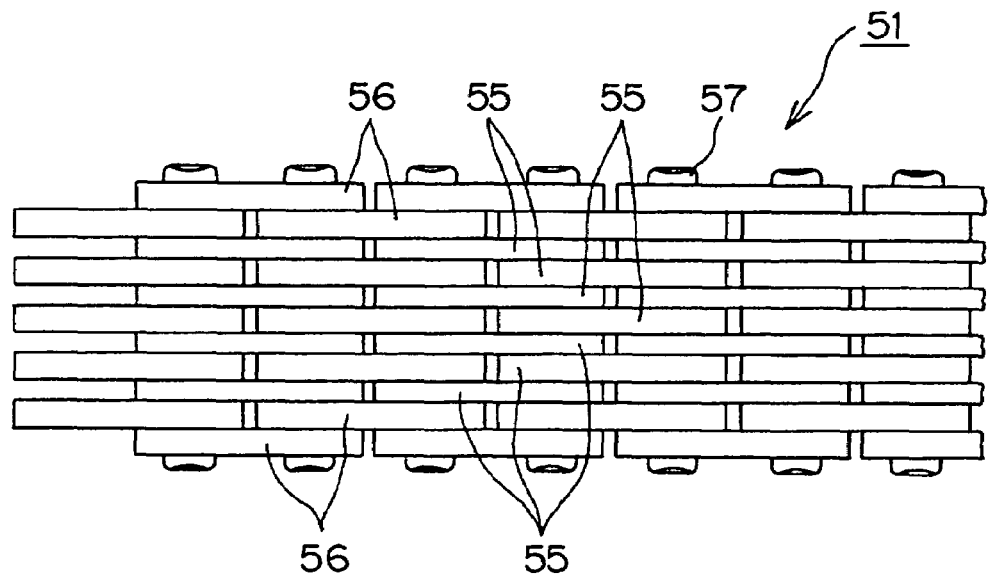
FIG. 7 is a plan view showing a part of a conventional double-sided silent chain.
Figure 8:
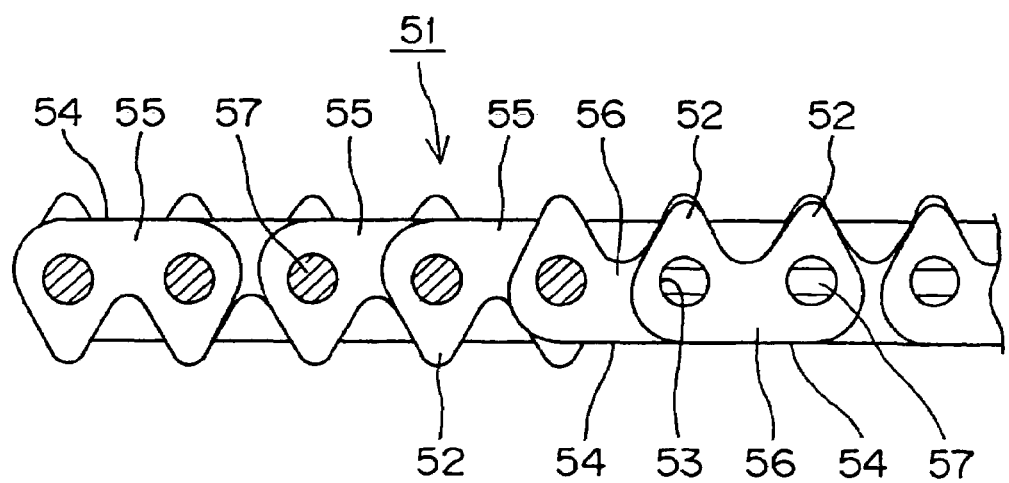
FIG. 8 is a partially broken-away side view showing a portion of the conventional chain of FIG. 7.

FIG. 5 shows an outer tooth seating type link plate. In the outer tooth seating type link plate, only the outer tooth surfaces 5a of the link teeth 5 are in contact with tooth surfaces of sprocket teeth T when the teeth are fully engaged and the link plate is seated on the sprocket without relative movement between the link plate and the sprocket teeth. FIG. 6 shows an inner tooth seating type link plate. In the inner tooth seating type link plate, only the inner tooth surfaces 5b of the link teeth 5 are in contact with tooth surfaces of sprocket teeth T when the teeth are fully engaged and the link plate is seated on the sprocket without relative movement between the link plate and the sprocket teeth.

The teeth of a link plate may be divided into two types: the "inner tooth contact type" and the "outer tooth contact type," depending on which tooth surfaces of the link teeth first come into contact with tooth surfaces of the sprocket at the start of engagement between the chain and the sprocket tooth surfaces. In the case of the "inner tooth contact type," the link teeth are formed so that, at the start of engagement between a link plate and the sprocket, an inner tooth surface of the link teeth first comes into contact with a tooth surface of the sprocket teeth. In the case of the "outer tooth contact type," the link teeth are formed so that, at the start of engagement between the link plate and the sprocket, an outer tooth surface of the link teeth first comes into contact with a tooth surface of the sprocket teeth. As engagement proceeds following the start of the engagement, the inner tooth surface and the outer tooth surface of a link plate slide on tooth surfaces of the sprocket teeth of the rotating sprocket so that the link plates reach one or the other of the seated conditions depicted in FIGS. 5 and 6.

Figure 9:
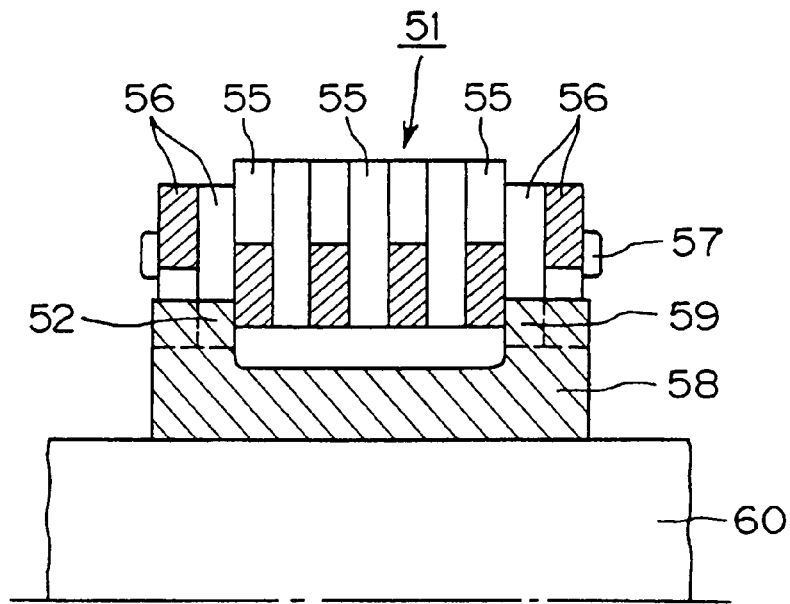
FIG. 9 is a cross-sectional view showing the engagement of an outer link plate with a sprocket at a first location along the length of the chain.
Figure 10:
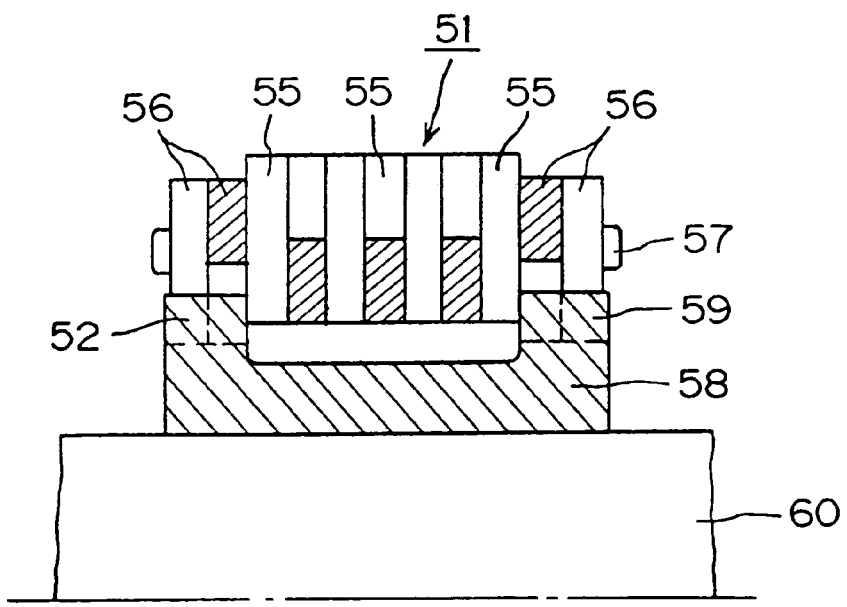
FIG. 10 is a cross-sectional view showing the engagement of an outer link plate with a sprocket at a second location along the length of the chain.
Figure 11:
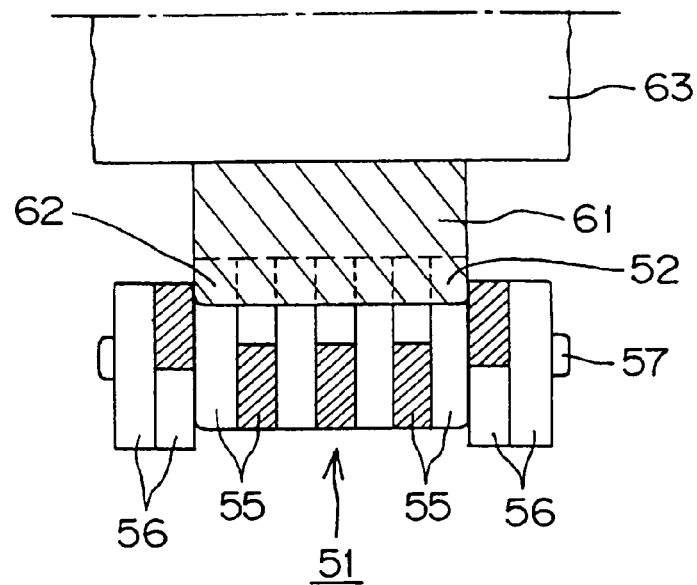
FIG. 11 is a cross-sectional view showing the engagement of an inner link plate with a sprocket.
Figure 12:
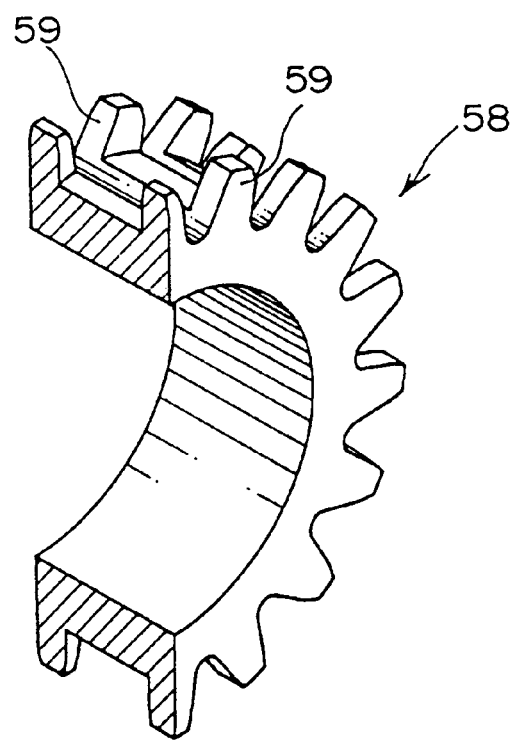
FIG. 12 is a fragmentary perspective view of a sprocket with which the outer link plates engage.

When the double-sided silent chain 1 is wrapped around a sprocket, the inner link plates, the outer link plates 3 and the outermost link plates 4 engage with sprocket teeth in the manner depicted in FIGS. 9 to 11. The sprocket which the outer link plates 3 and the outermost link plates engage corresponds to the sprocket 58 shown in FIG. 12, the sprocket having two sets of teeth 59 axially spaced on both sides in the direction of its width.

In the first embodiment, shown in FIG. 2, all of the link plates 2, 3 and 4 are inner tooth surface contact and outer tooth seating type link plates. The heights of the back surfaces of the outermost link plates 4 are greater than the heights of the back surfaces of the inner link plates 2 and may also be greater than the heights of the back surfaces of the adjacent outer link plates 3.

Because the connecting pins 11 are fixed to the pin holes of link plates 4, and the height of the back surfaces of the link plates 4 exceeds the heights H of the back surfaces of the other plates by a difference amount h, the strength of the center portions 10 of the outermost link plates is improved. Consequently, the rigidity of the link plate is improved, and a deformation of the link plate on engagement with the sprocket is suppressed. As a result the rotational fatigue strength of the double-sided silent chain 1 is improved.

As an alternative, the outermost link plates 4 and their adjacent outer link plates 3 may be of the inner tooth surface contact and inner tooth seating type. For the inner link plates 2, any combinations of the contact and seating types can be used.

In the first embodiment, even if only the backs of the outermost link plates are higher than the backs of the inner link plates, the chain effectively avoids deformation and crack formation in the outermost link plates, and achieves improved rotational fatigue strength.

Figure 3:
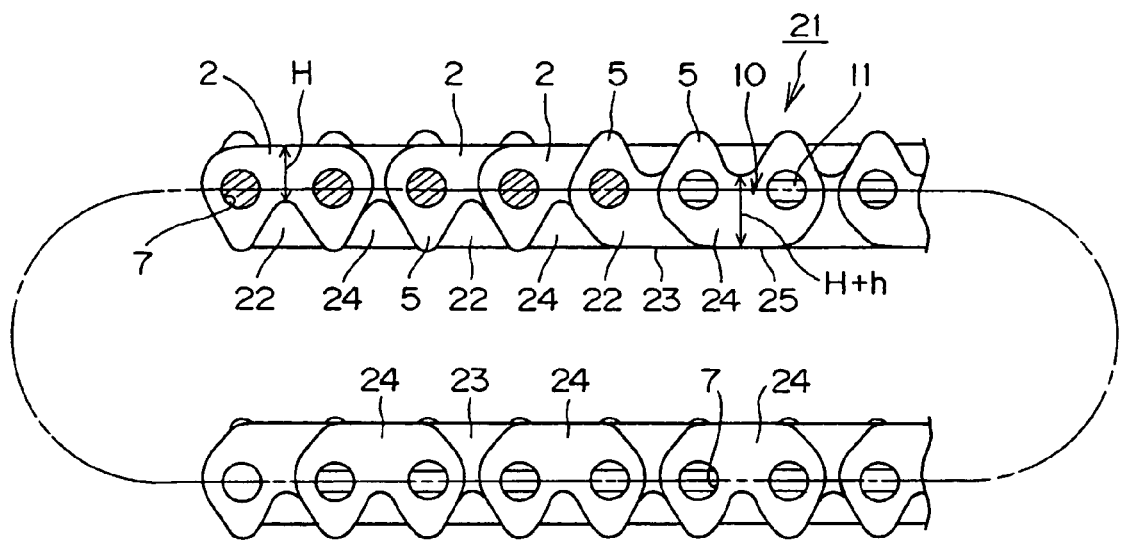
FIG. 3 is a partially broken-away side view showing portions of the double-sided silent chain in accordance with a second embodiment of the invention.

In the second embodiment of the invention, shown in FIG. 3, the double-sided silent chain 21 differs from the embodiment of FIGS. 1 and 2 only in that the heights of the backs of the outer link plates adjacent the outermost link plates, as well as the backs of the outermost link plate, are higher than the backs of the inner link plates. Otherwise the structure of the chain 21 is the same as that of the chain shown in FIGS. 1 and 2, and identical parts are denoted by the same reference numerals.

The heights of the backs of the inner link plates 2 are the same as those of link plates 2 in FIG. 2, and, as in the case of the link plates 2 in FIG. 2, the link plates 2 in FIG. 3 are of the inner tooth surface contact and outer tooth seating type. The outermost link plates 24 and their adjacent outer link plates 22 have the same size and the same shape, each having a pair of teeth 5 and a pair of pin holes 7. These link plates 24 and 22, respectively, have flat back surfaces 25 and 23 facing the direction opposite to the direction in which their teeth 5 protrude. The flat back surfaces 25 and 23 of link plates 24 and 22 are higher than the back surfaces of the inner link plates 2 by an amount h. Thus, if H represents the heights of the backs of the link plates 2 the heights of the backs 23 and 25 of link plates 22 and 24 are both represented by H+h. The outer link plates 22 and the outermost link plate 24 are also of the inner tooth surface contact and outer tooth seating type.

As in the case of FIG. 2, the teeth 5 of the inner link plates 2 protrude in a first direction, in this case toward the inside of the loop, while the teeth of the outer link plates 22 and the outermost link plates 24 protrude the opposite direction, toward the outside of the loop. The link plates are interleaved, alternately shifted longitudinally, and connected by connecting pins 11.

In the embodiment of FIG. 3, the outer link plates 22 and the outermost side link plate 24 are of the inner tooth surface contact and outer tooth seating type. However, inner tooth surface contact and inner tooth seating type link plates may be used instead. The inner link plates 2 may have any combination of contact and seating types.

Since the heights of the back surfaces of the outer link plates 22 and the outermost link plate 24 exceed the heights of the backs of the inner link plates by an amount h, the strength and rigidity of the center portions of link plates 22 and 25 are improved, and deformation of the link plates 22 and 25 upon engagement with a sprocket is suppressed. As a result, the rotational fatigue strength of the chain is improved. Furthermore, where the back surfaces 23 and 25 of the outer link plates 22 and the outermost link plate 24 are brought into sliding contact with a shoe of a chain guide, a greater contact area between the backs of the link plates and the shoe is provided, and wear of the shoe is decreased.

Figure 4:
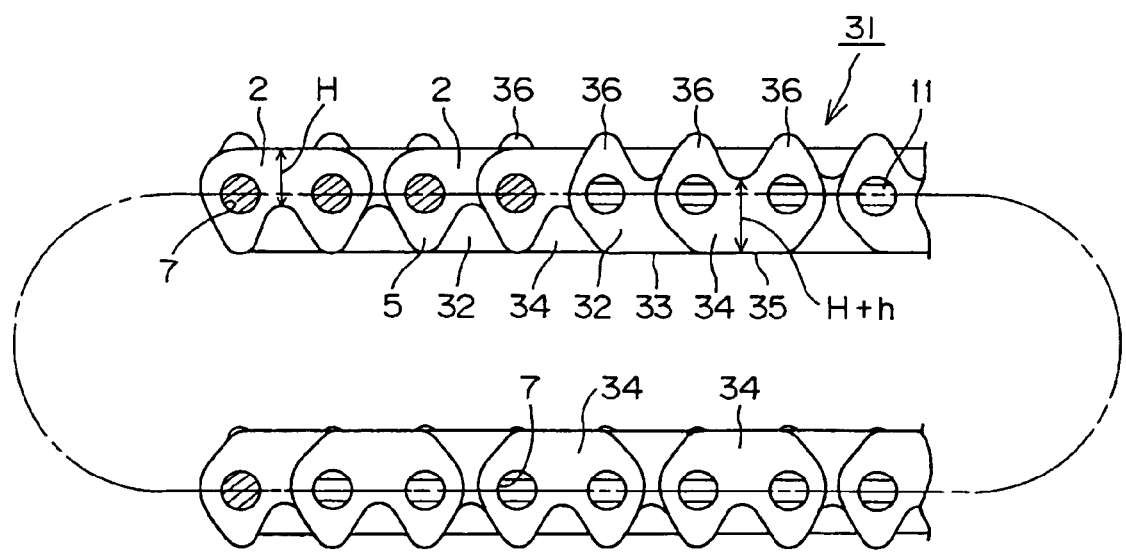
FIG. 4 is a partially broken-away side view showing portions of the double-sided silent chain in accordance with a third embodiment of the invention.

In the third embodiment of the invention, as depicted in FIG. 4, the double-sided silent-chain 31 also differs from the embodiment of FIGS. 1 and 2 in that the heights of the backs of the outer link plates adjacent the outermost link plates, as well as the backs of the outermost link plate, are higher than the backs of the inner link plates. Otherwise the configuration of the chain 21 is the same as that of the chain shown in FIGS. 1 and 2, and identical parts are denoted by the same reference numerals.

The heights of the backs of the inner link plates 2 are the same as those of link plates 2 in FIG. 2, and, as in the case of the link plates 2 in FIG. 2, the link plates 2 in FIG. 3 are of the inner tooth surface contact and outer tooth seating type. The outermost link plates 34 and their adjacent outer link plates 32 have the same size and the same shape, each having a pair of teeth 36 and a pair of pin holes 7. These link plates 34 and 32, respectively, have flat back surfaces 35 and 33 facing the direction opposite to the direction in which their teeth 36 protrude. The flat back surfaces 35 and 33 of link plates 34 and 32 are higher than the back surfaces of the inner link plates 2 by an amount h. Thus, as in the case of FIG. 3, if H represents the heights of the backs of the link plates 2 the heights of the backs 33 and 35 of link plates 32 and 34 are both represented by H+h.

As in the case of FIGS. 2 and 3, the teeth 5 of the inner link plates 2 protrude in a first direction, toward the inside of the loop, while the teeth 36 of the outer link plates 32 and the outermost link plates 34 protrude the opposite direction, toward the outside of the loop. The link plates are interleaved, alternately shifted longitudinally, and connected by connecting pins 11.

Whereas in the second embodiment of the invention, shown in FIG. 3, the outer link plates 22 and the outermost link plate 24 are preferably of the inner tooth contact and outer tooth seating type. In the case of the third embodiment, as shown in FIG. 4, the outer link plates 32 and the outermost link plates 34 are preferably of the outer tooth contact and outer tooth seating type. Here, as in the case of FIG. 3, the inner link plates 2 may have any combination of contact and seating types.

In the double-sided silent chain 31, the heights H+h of the back surfaces of the outer link plates 32 and the outermost side plate 34 exceed the heights H of the backs of the inner link plates by a difference h. Consequently, the strengths and rigidity of the central portions of these link plates 32 and 34 are improved, and deformation of the link plates 32 and 34 on engagement with a sprocket is suppressed. Further, since the outer link plates 32 and the outermost link plates 34 are outer tooth contact and outer tooth seating link plates, the inner tooth surfaces of the link teeth do not come into contact with the sprocket teeth, and the load applied to the central portion of the link plates is decreased. As a result, the rotational fatigue strength of the double-sided silent chain can be further improved.

Comparative tests were conducted on the three embodiments described above, which are summarized in the following table:

|  | Conventional Example | First Embodiment | Second Embodiment | Third Embodiment |
| --- | --- | --- | --- | --- |
| Inner link plate |  |  |  |  |
| Height of back | Low | Low | Low | Low |
| Tooth contact type | Inner tooth surface contact | Inner tooth surface contact | Inner tooth surface contact | Inner tooth surface contact |
| Seating type | Outer tooth surface seating | Outer tooth surface seating | Outer tooth surface seating | Outer tooth surface seating |
| Outer link plate |  |  |  |  |
| Height of back | Low | Low | High | High |
| Tooth contact type | Inner tooth surface contact | Inner tooth surface contact | Inner tooth surface contact me as left | Outer tooth surface contact |
| Seating type | Outer tooth surface seating | Outer tooth surface seating | Outer tooth surface seating | Outer tooth surface seating |
| Outermost link plate |  |  |  |  |
| Height of back | Low | High | High | High |
| Tooth contact type | Inner tooth surface contact | Inner tooth surface contact | Inner tooth surface contact | Outer tooth surface contact |
| Seating type | Outer tooth surface seating | Outer tooth surface seating | Outer tooth surface seating | Outer tooth surface seating |

Figure 13:
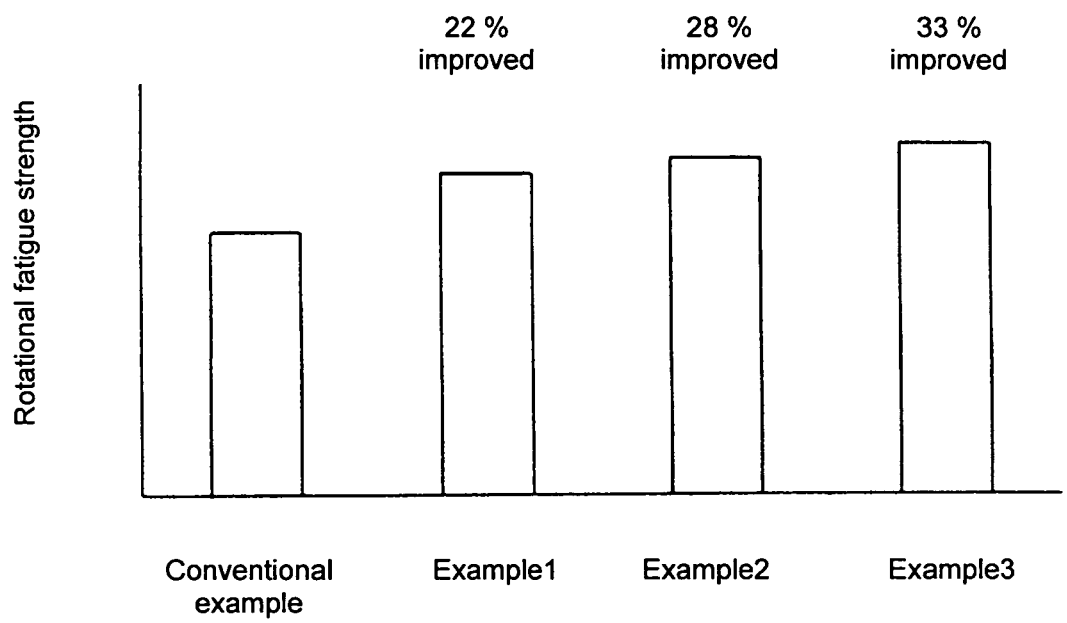
FIG. 13 is a graph showing the results of comparative tests of rotational fatigue strength.

Rotational fatigue strength was tested, and the results are shown in the graph of FIG. 13. The rotational fatigue strength of the first embodiment was improved by 22% over a conventional double-sided silent chain. The improvement in the second embodiment was 28%, and the improvement in the third embodiment was 33%.

The chains in accordance with the invention are preferably subjected to special surface treatment using metal carbides containing Cr, V, Ti, Nb, W or the like to decrease the wear of the connecting pins.

In the embodiments described, the teeth of the inner link plates protrude toward the inside of the chain loop while the teeth of the outer link plates, and the outermost link plates, along both sides of the chain, protrude toward the outside of the chain loop. The advantages of the invention can be realized in alternative embodiments, for example, an embodiment in which the teeth of the inner link plates protrude outward and the teeth of the outer and outermost link plates protrude inward.

We claim:

1. An elongated, double-sided silent chain comprising a plurality of link plates, each having a pair of pin holes, a pair of link teeth projecting in a first direction, and a back surface facing in a direction opposite to said first direction, each said back surface having a portion that is flat when viewed in a direction mutually perpendicular to said first direction and the direction of elongation of the chain, said link plates including outermost link plates on both sides of the chain in the widthwise direction of the chain, and the link plates being interleaved, connected together in an endless loop by connecting pins extending through the pin holes and fixed to the outermost link plates, wherein the link plates include a first set of link plates including said outermost link plates and adjacent outer link plates, and a second set of inner link plates disposed between the outer link plates, the teeth of one of the sets projecting toward the inside of the loop, and the teeth of the other set projecting toward the outside of the loop, wherein all the teeth of the outermost link plates and of the outer link plates project toward one of said inside and outside of the loop, wherein the flat portion of the back surface of each of the outermost link plates extends at least as far as any other part thereof in the direction opposite to the direction in which the teeth thereof protrude, wherein the flat portion of the back surface of each of said outer link plates also extends at least as far as any other part thereof in the direction opposite to the direction in which the teeth thereof protrude, wherein the tooth forms of the outermost link plates are the same as the tooth forms of said outer link plates, and wherein the heights of the back surfaces of the outermost link plates are the same as the heights of the back surfaces of said outer link plates and greater than the heights of the back surfaces of the inner link plates.

2. A double-sided silent chain according to claim 1, in which said outermost link plates and said adjacent outer link plates are outer tooth surface seating link plates.

* * * * *